3,329,675
6-(1-AMINOARYLCYCLOALKYLCARBOXAMIDO)-
PENICILLANIC ACIDS
Harvey E. Alburn, West Chester, Donald E. Clark, Norristown, Norman H. Grant, Wynnewood, and Peter B. Russell, Villanova, Pa., assignors to American Home Products Corporation, New York, N.Y., a corporation of Delaware
No Drawing. Filed Aug. 17, 1966, Ser. No. 572,910
5 Claims. (Cl. 260—239.1)

This invention relates to new synthetic penicillins having potent activity against gram-negative and gram-positive micro-organisms.

The new synthetic penicillins of the present invention, when considered in their broadest aspects, include those compounds encompassed within the following structural formula:

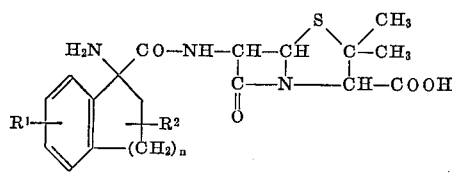

wherein $R^1$ and $R^2$ each may be selected from the group consisting of hydrogen, lower alkyl, lower alkoxy, aryl and aryloxy; and $n$ is an integer from 1 to 2.

The novel compounds of the invention may generally be prepared by reacting a suitable 4-substituted-2,5-oxazolidinedione (also known as an N-carboxy amino acid anhydride or NCA) which 6-amino penicillanic acid (6–APA). Preferably a mixture of 6–APA, methylene chloride and triethylamine is first prepared, the mixture may then be treated with glacial acetic acid and stirred, and thereafter the selected N-carboxy anhydride is added, and stirring is continued. Alternatively, the glacial acetic acid may be added subsequently to the admixture of the separate organic solvent solutions of the 6–APA and of the N-carboxy amino acid anhydride. The novel compounds of the invention, resulting from the reaction between 6–APA and the N-carboxy amino acid and anhydride may then be recovered by conventional procedures such as filtration, concentration, water extraction and precipitation from organic solvents, as indicated.

The new compounds of the series defined above show desirable broad spectrum antibacterial activity and are useful as therapeutic agents for poultry and mammals, including man, in the treatment of infectious diseases caused by gram-positive and gram-negative bacteria, by either parenteral or oral administration. They also have use as nutritional supplements in animal feed.

As will be understood by those skilled in the art, the compounds of the invention may be utilized in their acid form or in the form of the therapeutically-active salts thereof, e.g., the sodium or potassium salts, or hydrochloride, sulfate, fumarate, etc., or in the form of the pharmaceutically-acceptable acid addition salts prepared by the reaction of the penicillin compounds with an amine or diamine base, e.g., procaine or various N-N'-disubstituted alkylene diamines, such as N,N'-dibenzylethylenediamine, etc.

As will also be understood by those skilled in the art, the compounds of the invention may be utilized in suitable dosage forms, including solutions, suspensions, tablets, capsules, and the like, utilizing conventional solvents, suspensoids, excipients, and the like.

The following examples are illustrative of the invention, but are not to be considered necessarily limitative thereof:

EXAMPLE I 6-(1-amino-1,2,3,4-tetrahydro-6-methoxy-1-naphthamido)penicillanic acid A mixture of 6.3 grams of 6–APA, 60 ml. of methylene chloride, and 2 ml. of triethylamine was stirred at room temperature for two hours. To said mixture was added a second mixture of 7.22 grams of the N-carboxy amino acid anhydride of the side chain precursor; i.e., the N-carboxy anhydride of 1 - amino - 1,2,3,4 - tetrahydro - 6-methoxy-1-naphthoic acid, and 60 ml. methylene chloride, and the total mixture was stirred at room temperature for 20 hours. After filtration, 1.7 ml. of glacial acetic acid was added, and the solution was concentrated to 33 ml. The concentrated solution was then added to 400 ml. of ethyl ether and a solid product separated. This product, the title compound, was active against *Bacillus subtilis*, *Staphylococcus aureus* and *Meisseria catarrhalis*.

EXAMPLE II 6-(1-amino-1-indancarboxamido)penicillanic acid

A mixture of 5.4 grams of 6–APA, 60 ml. of methylene chloride, and 7 ml. of triethylamine was stirred at room temperature for 30 minutes. The mixture was treated with 1.5 ml. of glacial acetic acid, and was then stirred at −11° C. for 30 minutes. Five grams of N-carboxy-1-amino-1-indancarboxylic acid anhydride was then added, and stirring was continued for 16 hours at −11° C. The mixture was extracted five times with water, giving 290 ml. of total extract. This was adjusted to pH 6.5 and chromatographed at 2° Dowex 1×10 (bicarbonate) column. The product was eluated with $CO_1$-saturated water, and the β-lactam-positive peak was lyophilized. The resulting product, the title compound, was active against *Bacillus subtilis*, *Staphylococcus aureus* and *Salomnella paratyphi*.

The N-carboxy acid anhydrides suitable for use in the preparation of the novel penicillanic acid compounds of this invention may be prepared by known procedures such as those referred to or described, for example, in U.S. Patent No. 3,194,802 of H. E. Alburn, N. H. Grant and H. Fletcher, 3rd.

EXAMPLE III

Following the procedure of Example I, the N-carboxy amino acid anhydride given in Table A below were respectively reacted with 6–APA to obtain the respective products also given in the table.

TABLE A

| N-Carboxy Amino Anhydride of— | Penicillanic Acid Product formed |
|---|---|
| 1-amino-1,2,3,4-tetrahydro-7-ethoxy-1-naphthoic acid. | 6-(1-amino-1,2,3,4-tetrahydro-7-ethoxy-1-naphthamido)penicillanic acid. |
| 1-amino-1,2,3,4-tetrahydro-3,6-dimethyl-1-naphthoic acid. | 6-(1-amino-1,2,3,4-tetrahydro-3,6-dimethyl-1-naphthamido)penicillanic acid. |
| 1-amino-4-phenyl-1-indancarboxylic acid. | 6-(1-amino-4-phenyl-1-indancarboxamido)penicillanic acid. |
| 1-amino-3-phenoxy-1-indancarboxylic acid. | 6-(1-amino-3-phenoxy-1-indancarboxamido)penicillanic acid. |
| 1-amino-4-butyl-1-indancarboxylic acid. | 6-(1-amino-4-butyl-1-indancarboxamido)penicillanic acid. |

We claim:
1. A compound having the formula:

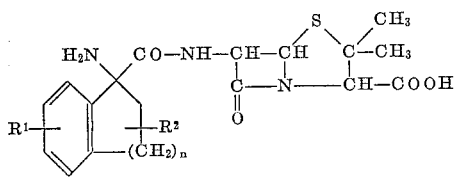

wherein $R^1$ and $R^2$ are each selected from the group consisting of hydrogen lower alkyl, lower alkoxy, phenyl and phenyloxy; and $n$ is an integer from 1 to 2.

2. A compound as defined in claim 1, which compound is: 6 - (1 - amino-1,2,3,4-tetrahydro-6-methoxy-1-naphthamido)penicillanic acid.

3. A compound as defined in claim 1, which compound is: 6 - (1 - amino-1-indancarboxamido)penicillanic acid.

4. A compound as defined in claim 1, which compound is: 6-(1-amino-1,2,3,4-tetrahydro-1-naphthamido)-penicillanic acid.

5. A compound as defined in claim 1, which compound is: 6 - (1 - amino - 1,2,3,4 - tetrahydro - 5-ethyl-1-naphthamido)penicillanic acid.

No references cited.

NICHOLAS S. RIZZO, *Primary Examiner.*